United States Patent
Mazzini et al.

(10) Patent No.: US 8,483,577 B2
(45) Date of Patent: Jul. 9, 2013

(54) PROGRAMMABLE SIGNAL EMPHASIS FOR OPTICAL TRANSMITTERS

(75) Inventors: Marco Mazzini, Sesto San Giovanni (IT); Cristiana Muzio, Ivrea (IT); Pirooz Tooyserkani, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 12/339,123

(22) Filed: Dec. 19, 2008

(65) Prior Publication Data

US 2010/0158538 A1    Jun. 24, 2010

(51) Int. Cl.
*H04B 10/04* (2006.01)
*H04B 10/12* (2006.01)

(52) U.S. Cl.
USPC .......................................... 398/193; 398/194

(58) Field of Classification Search
USPC .................................................. 398/193, 194
See application file for complete search history.

(56) References Cited

U.S. PATENT DOCUMENTS

| | | | |
|---|---|---|---|
| 2007/0093086 A1* | 4/2007 | Davis et al. | 439/76.1 |
| 2008/0131118 A1* | 6/2008 | Chiang | 398/45 |
| 2008/0247453 A1* | 10/2008 | An et al. | 375/233 |
| 2010/0221017 A1* | 9/2010 | Ghiasi | 398/149 |

* cited by examiner

*Primary Examiner* — Nathan Curs

(57) ABSTRACT

A method includes delivering an electrical signal over an electrical conductor to a transmitter module, which includes a memory holding compensation values corresponding respectively to different conductor lengths. One or more of the compensation values is retrieved from the memory of the transmitter module, and a waveform of the electrical signal is modified responsively to the retrieved compensation values. The electrical signal having the modified waveform is transmitted using the transmitter module over a communication link.

25 Claims, 3 Drawing Sheets

PROGRAMMABLE SIGNAL EMPHASIS FOR OPTICAL TRANSMITTERS

FIELD OF THE INVENTION

The present invention relates generally to communication systems, and particularly to methods and systems for pre-emphasizing signals transmitted over optical links.

BACKGROUND OF THE INVENTION

Various communication networks communicate over optical links. For example, IEEE 802.3ae-2002™ standard, Aug. 30, 2002, and IEEE Draft P802.3aq™/D4.0, May, 2006, which are incorporated herein by reference, define physical layer specifications for communicating over optical fibers. Section 52-5 of the IEEE 802.3ae-2002 standard specifies both Short Range (SR) and Long Range (LR) fiber links. Section 68.5 of the IEEE P802.3aq™/D4.0 draft defines a Long Range Multimode (LRM) fiber link.

Optical fiber links are typically terminated with optical transceivers, which convert optical signals to electrical signals and vice versa. Optical transceivers may conform to various specifications and form factors, such as, for example, the XENPAK, X2, XFP, Small Form-factor Pluggable (SFP) and Small Form-factor Pluggable Plus (SFP+) form factors. The SFP+ form factor, for example, is specified in a specification published by the SFP+ committee, entitled "Specifications for Enhanced Small Form Factor Pluggable Module," (SFF-8431), revision 3.2, Nov. 12, 2008, which is incorporated herein by reference. The XFP form factor is specified in "10 Gigabit Small Form Factor Pluggable Module," (INF-8077i), revision 4.0, the SFP+ committee, Apr. 13, 2004, which is incorporated herein by reference. The Xenpak form factor is specified in "A Cooperation Agreement for 10 Gigabit Ethernet Transceiver Package," Issue 3.0, Sep. 18, 2002, which is incorporated herein by reference. The X2 form factor is specified in "A Cooperation Agreement for a Small Versatile 10 Gigabit Transceiver Package," Issue 2.0b, Apr. 7, 2005, which is incorporated herein by reference.

The present invention will be more fully understood from the following detailed description of the embodiments thereof, taken together with the drawings in which:

BRIEF DESCRIPTION OF THE DRAWINGS

FIGS. 1 and 2 are block diagrams that schematically illustrate an optical line card, in accordance with an embodiment of the present invention;

FIG. 3 is a graph showing a pre-emphasized electrical signal, in accordance with an embodiment of the present invention;

FIG. 4 is a flow chart that schematically illustrates a method for pre-emphasizing an electrical signal, in accordance with an embodiment of the present invention; and FIG. 5 is a block diagram that schematically illustrates a setup for calibrating signal emphasis parameters, in accordance with an embodiment of the present invention.

DESCRIPTION OF EXAMPLE EMBODIMENTS

Overview

In various types of optical communication equipment, an electrical signal traverses an electrical conductor (e.g., a circuit trace) before it is converted into an optical signal. For example, line cards in optical switches typically deliver electrical signals over circuit traces to optical transmitters. The optical transmitters convert the electrical signals into optical signals for transmission over optical fibers.

In many practical cases, the circuit trace distorts the electrical signal traveling through it. Typically, the circuit trace attenuates high-frequency components of the electrical signal. This sort of distortion degrades the quality of the transmitted optical signal produced by the optical transmitter, and sometimes prevents the optical signal from meeting its specified quality level.

The distortion caused by the circuit trace can be corrected by pre-emphasizing the electrical signal, so as to enhance its high-frequency components and compensate for the frequency-selective circuit trace attenuation. In some cases, however, the distortion of the electrical signal depends on the length of the circuit trace, as well as on the properties of the specific optical transmitter to which the electrical signal is provided. Therefore, the optimal amount of pre-emphasis that should be applied to the electrical signal also depends on these factors.

Embodiments of the present invention that are described here in below provide improved methods and systems for pre-emphasizing electrical signals in optical communication equipment. When pre-emphasizing a given electrical signal that traverses a given circuit trace en-route to a given optical transmitter, the disclosed methods and systems take into account the actual trace length in question and the properties of the specific optical transmitter.

In some embodiments, the optical transmitter is integrated with a memory, to form an optical transmitter module. The optical transmitter module conforms to a certain form factor, such as SFP+. The memory holds multiple compensation values, each compensation value corresponding to a certain circuit trace length. Each compensation value in the memory specifies the amount of pre-emphasis that, if applied to the electrical signal, would best compensate for the distortion caused by a circuit trace having the corresponding length.

Pre-emphasis of the electrical signal is applied by a compensation unit, such as an Electric Dispersion Compensator (EDC), which is controlled by a processor. In order to pre-emphasize the electrical signal, the processor reads one or more of the compensation values from the memory of the corresponding optical transmitter module. The processor computes the appropriate compensation value based on the values read from the memory and on the actual length of the circuit trace. The actual circuit trace length is assumed to be known (e.g., pre-programmed) to the processor in advance. The processor then configures the corresponding EDC to apply the computed compensation value to the electrical signal.

Since the memory is an integral part of the optical transmitter module, the compensation values stored in the memory can account for module-specific properties, e.g., internal wiring or connectors in the transmitter module. Such properties may differ, for example, from one type of module to another (e.g., between modules produced by different vendors), between individual modules, and/or from one lot of modules to another.

In some embodiments, the compensation values stored in the memory of the optical transmitter module are determined by a-priori characterization of the module and the EDC for different circuit trace lengths. An example of a calibration setup for performing such a characterization is described herein.

In summary, the disclosed methods and systems enable accurate pre-emphasis of an electrical signal, by accounting for the actual circuit trace length and for the specific properties of the optical transmitter module involved. The accurate electrical signal pre-emphasis improves the quality of the optical signal, and thus the overall performance of the optical communication equipment.

System Description

Figure 1:
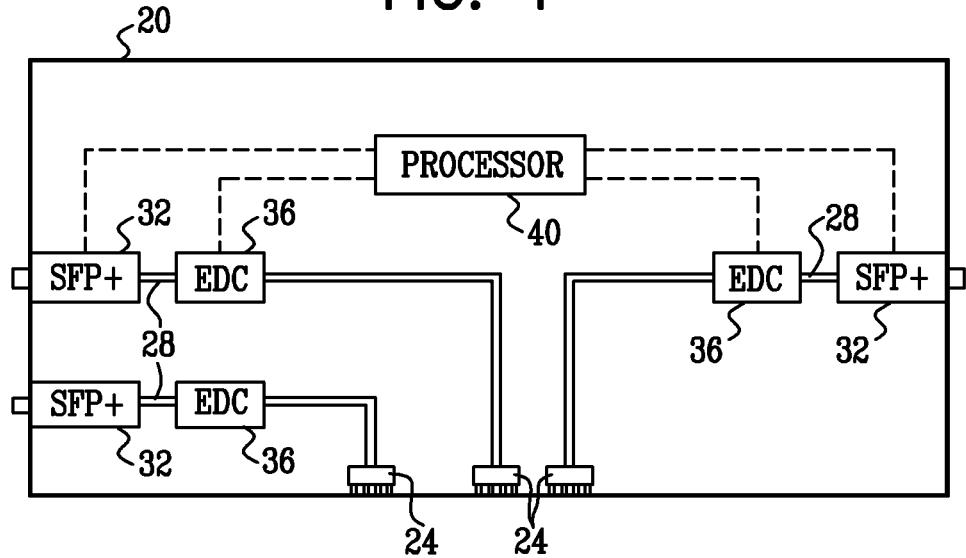

FIG. 1 is a block diagram that schematically illustrates an optical line card 20, in accordance with an embodiment of the present invention. Card 20 produces one or more electrical signals and converts them into respective optical signals, in order to transmit the optical signals over optical fiber links. For example, card 20 may be part of an optical switch or other communication equipment.

Card 20 comprises one or more Serializer/Deserializer (SERDES) devices 24, which produce the electrical signals. In a typical line card configuration, the line card is connected to a motherboard (not shown in the figures), and the SERDES devices produce the electrical signals in response to data that is received from the motherboard. Alternatively, the electrical signals can be produced by any other suitable signal source on card 20.

The electrical signals produced by SERDES devices 24 are delivered over electrical conductors, such as circuit traces 28, and are provided to optical transmitter modules 32. The electrical signals typically comprise train pulses having rates in the range of 1.25 to 10.3125 Gb/s. Alternatively, any other suitable pulse rates can be used. Each optical transmitter module converts the input electrical signal into a respective optical signal. The optical signal is then transmitted over an optical fiber (not shown in the figures) that is connected to the module.

(The methods and systems described herein are mainly concerned with optical transmission rather than reception. Therefore, modules 32 are referred to herein as optical transmitter modules. Typically, however, modules 32 comprise optical transceivers, which perform optical transmission as well as reception.)

Card 20 typically comprises a Printed Circuit Board (PCB) on which traces 28 are disposed. Card 20 and traces 28 may be fabricated using different materials and processes. For example, card 20 may comprise a single-layer of multi-layer PCB. The PCB may be fabricated from any suitable substrate material, such as Flame Retardant 4 (FR4). Traces 28 may comprise differential micro strip traces, strip line traces or any other suitable type of electrical conductors.

Modules 32 may conform to different specifications and form factors, such as XENPAK, X2, XFP, SFP or SFP+. In the embodiments described herein, modules 32 conform to the SFP+ form factor, and are therefore sometimes referred to as SFP+ modules. The methods and systems described herein, however, are not limited to this particular form factor, and may be used with optical transceiver modules having any other suitable form factor.

The optical signal at the output of module 32 is often expected to meet a certain quality level. The quality level may be defined in terms of various properties of the optical signal, such as the signal jitter, the eye mask of the signal, the signal Transmitter Waveform Dispersion Penalty (TWDP), the signal extinction ratio, or any other suitable property. For example, the IEEE 802.3ae-2002 standard, cited above, defines a test point denoted TP2 at which the optical signal quality is to be evaluated. Table 52-7 of this standard, for example, specifies transmitter requirements for 10 GBASE-SR links.

The optical signal, however, is often subject to various kinds of impairments, which distort its quality level. The distortion may be caused by both optical and electrical elements. In particular, any distortion of the electrical signal that is provided to module 32 will appear in the optical signal.

In many practical cases, circuit traces 28, which deliver the electrical signals to SFP+ module 32, distort the electrical signals passing through them. Typically, the circuit traces have a frequency response that declines over frequency. In other words, the circuit traces tend to attenuate higher-frequency components of the electrical signal more than lower-frequency components. The amount of high-frequency attenuation typically increases with the length of the circuit trace, meaning that long traces cause higher distortion than short traces. As a result of this effect, an electrical signal traversing a given circuit trace will typically suffer from frequency-selective attenuation, whose severity depends on the length of the trace.

In order to compensate for distortion in the electrical signals, card 20 comprises compensation units, such as Electrical Dispersion Compensators (EDCs) 36. Each EDC is able to modify the waveform of an incoming electrical signal, so that the electrical signal at its output will have a reduced distortion level. Typically, the EDC applies a digital equalization operation to the electrical signal, using one or more filter coefficients (taps) that can be programmed externally. EDC components that can be used for this purpose are produced, for example, by Applied Micro Circuits Corporation (AMCC—Sunnyvale, Calif.), Netlogic Microsystems (formerly Aeluros, Mountain View, Calif.), Broadcom Corp. (Irvine, Calif.), Cortina Systems, Inc. (Sunnyvale, Calif.) and Vitesse Semiconductor Corp. (Camarillo, Calif.).

In the context of signal distortion, the length of a given circuit trace is typically measured from the point the electrical signal is produced, regenerated, re-timed, re-sampled or otherwise manipulated to the point the signal is provided to the SFP+ module. For example, if no regeneration or re-timing is performed between the SERDES and the SFP+ module, the trace length is measured between the SERDES output and the SFP+ module input. In the embodiments described herein, however, the compensation mainly concerns the stretch of circuit trace between EDC 36 and SFP+ module 32. Typically but not necessarily, the distortion introduced by the circuit trace between the SERDES and the EDC is corrected by applying fixed compensation by the EDC.

Line card 20 further comprises a processor 40, which controls and configures the different elements of line card 20. In particular, processor 40 configures EDCs 36 using data that is read from SFP+ modules 32, using methods that are described in detail below. The functions of processor 40 may be implemented in software, using hardware or firmware elements, or using any suitable combination of hardware, firmware and software elements. In some embodiments, processor 40 comprises a general-purpose processor, which is programmed in software to carry out the functions described herein. The software may be downloaded to processor 40 in electronic form, over a network, for example, or it may, alternatively or additionally, be provided and/or stored on tangible media, such as magnetic, optical, or electronic memory.

Figure 2:
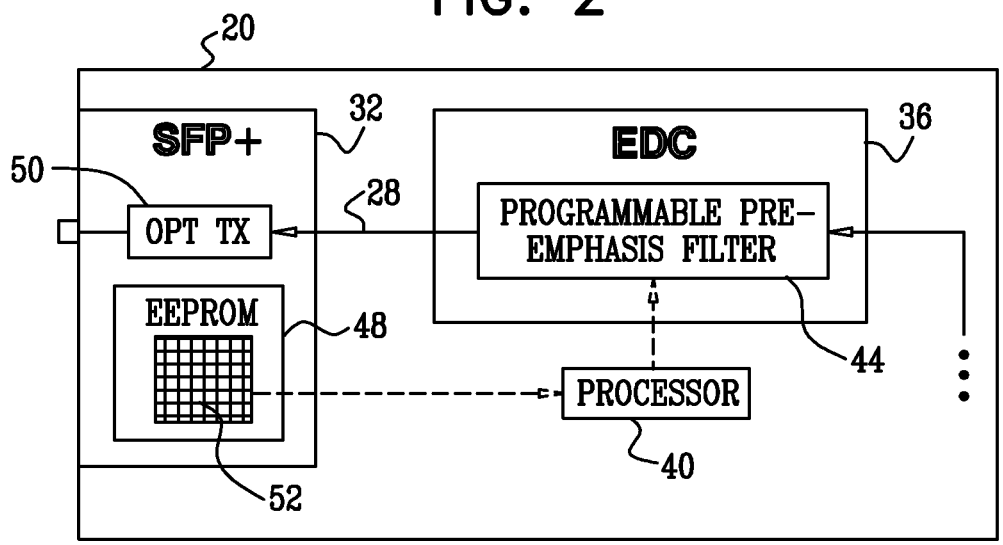
Figure 3:
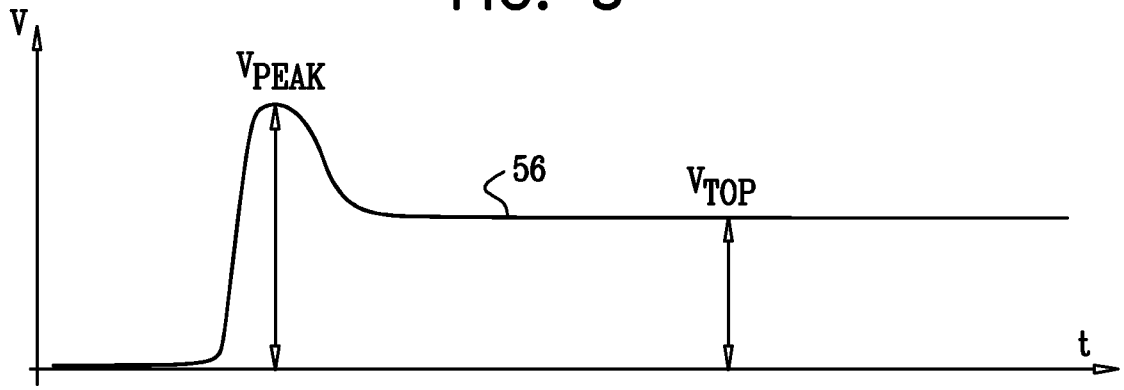

FIG. 2 is a block diagram that schematically illustrates line card 20, and in particular some internal structure of SFP+ module 32 and EDC 36, in accordance with an embodiment of the present invention. EDC 36 comprises a programmable pre-emphasis filter 44, which filters the electrical signal traversing circuit trace 28. An example of a pre-emphasis operation is shown in FIG. 3 below. Filter 44 may comprise digital and/or analog circuitry, and may apply linear and/or non-linear filtering, as appropriate. Filter 44 is configurable by processor 40. In other words, processor 40 can program filter 44 to apply the appropriate pre-emphasis operation to the electrical signal.

In some embodiments, in addition to filter 44, EDC 36 comprises an amplifier (not shown in the figure) whose gain can be controlled by processor 40. In these embodiments, processor 40 may set the desired compensation value by controlling both the gain of the EDC amplifier and the filter taps. This technique increases the achievable granularity of setting the compensation value. For example, in a typical EDC, setting the amplifier gain to one of three possible levels provides a granularity of 1-1.5%, in comparison to ~4% granularity achieved in a single gain setting of the amplifier.

(Since the present patent application is mainly concerned with signal transmission, elements of EDC 36 that are related to signal reception were omitted from the figure for the sake of clarity. In practice, however, EDC 36 often performs dispersion compensation to the received signals, as well.)

Module 32 comprises an optical transducer 50, which converts the electrical signal into an optical signal at the desired wavelength and interfaces with the optical fiber. In addition, module 32 comprises an internal memory 48, such as an Electrically Erasable Programmable Read Only Memory (EEPROM), which can be accessed by processor 40. Optical transducer 50, memory 48, and any other circuitry of module 32, are typically packaged in a mechanical package that conforms to the SFP+ form factor. Typically, module 32 is detachable and can be inserted into and removed from card 20, as desired.

Compensation for Electrical Signal Distortion Depending on Trace Length and SFP+ Module Properties The internal structure and configuration of SFP+ module 32 may affect the actual trace length that distorts the electrical signal. Such variations may comprise, for example, effects caused by internal wiring or connectors in the module. Thus, variations from one module 32 to another may cause the actual trace length to vary, as well. These variations may comprise unit-to-unit variation or lot-to-lot variations caused, for example, by manufacturing tolerances. Moreover, module 32 may have different versions that conform to the same interface specification and form factor but differ in internal design. For example, different versions of module 32 may be produced by different vendors.

A practical implication of these variations is that the appropriate compensation, which should be applied by EDC 36, may vary depending on the specific SFP+ module 32 to which the signal is provided.

Figure 5:
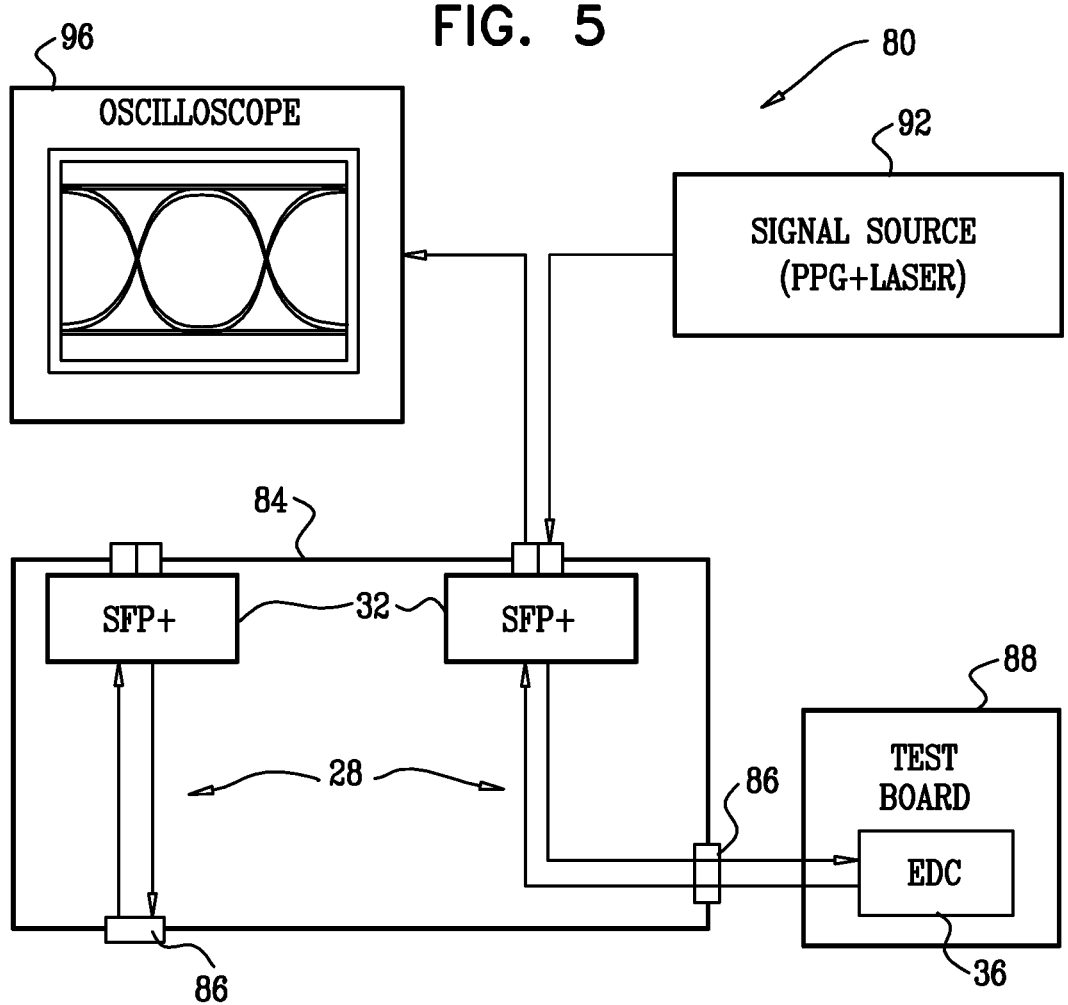

In order to account for these variations when applying distortion compensation by EDC 36, memory 48 of SFP+ module 32 holds a table 52 of pre-programmed compensation values, which specify the compensation that should be applied to the electrical signal provided to this SFP+ module, for various circuit trace lengths. Typically, a set of lengths is defined, so as to cover the overall range of possible trace lengths. For example, table 52 may be pre-programmed with compensation values corresponding to trace lengths between one and eight inches. The trace lengths in the table need not necessarily be distributed uniformly over the range. For example, the table may hold compensation values for a number of trace lengths that have been pre-measured in a calibrated setup. An example of such a setup is shown in FIG. 5 below.

Since memory 48 is an integral part of module 32, the compensation values programmed into table 48 may take into account effects that are specific to the particular SFP+ module. An example of a process for determining the appropriate compensation values for a given module 32 is described further below.

In order to compensate for the distortion caused to a given electrical signal by a given circuit trace 28 and a given SFP+ module 32, processor 40 reads one or more of the compensation values from memory 48 of the SFP+ module. The actual length of the circuit trace in question is known, and is assumed to be provided (e.g., pre-programmed) to processor 40 in advance. Processor 40 configures EDC 36 on this circuit trace based on (1) the known actual trace length and (2) the compensation values read from memory 48 of the SFP+ module. An example of a process of this sort is described in FIG. 4 below.

Processor 40 may read memory 48 and configure EDC 36 in response to a certain triggering condition, such as when the line card is reset, switched on or connected to power, upon detecting that an SFP+ module has been inserted to the card, or in response to any other suitable condition or event.

FIG. 3 is a graph showing a pre-emphasized electrical signal, in accordance with an embodiment of the present invention. A curve 56 shows the electrical signal at the output of EDC 36, in response to a step pulse input. In the present example, the input signal comprises a sequence of sixty-four "0" pulses, followed by sixty-four "1" pulses. As can be seen in the figure, the EDC pre-emphasizes the leading edge of the electrical signal. The leading edge of the signal reaches a maximum voltage denoted $V_{PEAK}$, and then stabilizes at a nominal voltage denoted $V_{TOP}$. The amount of pre-emphasis (also referred to as a compensation value) is defined as $(V_{PEAK}-V_{TOP})/V_{TOP}$.

The pre-emphasis operation applied by EDC 36 enhances the high-frequency components of the signal, and therefore compensates for the high-frequency attenuation caused by the circuit trace. The amount of pre-emphasis is configured by processor 40, using the methods described herein. Although the example of FIG. 3 refers to pre-emphasis of the leading edge of the electrical signal, pre-emphasis can also be applied to the trailing edge of the signal, or to both leading and trailing edges.

Compensation Method Description

Figure 4:
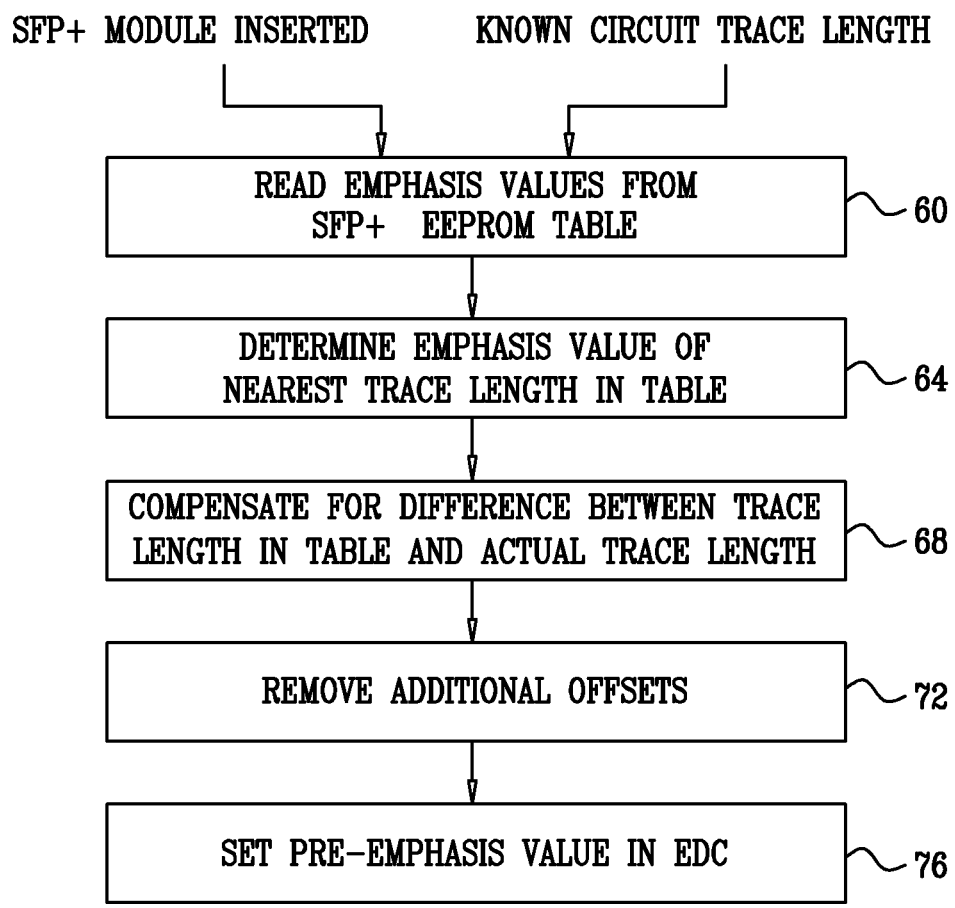

FIG. 4 is a flow chart that schematically illustrates a method for pre-emphasizing an electrical signal, in accordance with an embodiment of the present invention. The description that follows refers to a single SFP+ module 32 and a single EDC 36 that are connected to a particular circuit trace 28. Typically, however, the method is carried out by processor 40 on line cards that contain multiple SFP+ modules, EDCs and circuit traces.

The method begins when processor 40 detects that EDC 36 should be configured. As noted above, the processor may detect that an SFP+ module has been inserted to a port connected to the EDC in question. Additionally or alternatively, the method of FIG. 4 can be initiated at power-on or after reset of card 20. It is also assumed that the actual length of the circuit trace in question is known to processor 40 in advance. In some embodiments, the EDC is initially configured with a certain default compensation value, which does not take into account the effects of the specific SFP+ module.

Processor 40 accesses memory 48 of SFP+ module 32 and reads one or more of the compensation values stored in table 52, at a memory access step 60. In some embodiments, processor 40 reads all the compensation values in the table.

Alternatively, the processor may read only some of the values, e.g., values that are close to the actual length of trace 28.

Processor 40 identifies a compensation value in table 52, whose corresponding trace length is nearest to the known actual length of trace 28, at a nearest length identification step 64. For example, consider the following example of table 52:

| Data address | Data size (bytes) | Description | Dec value | Hex value |
|---|---|---|---|---|
| 224 | 1 | Comp value for case 1 (1.6 inches) | 26% | 0x1A |
| 225 | 1 | Comp value for case 2 (2 inches) | 30% | 0x1E |
| 226 | 1 | Comp value for case 3 (4 inches) | 34% | 0x22 |
| 227 | 1 | Comp value for case 4 (5 inches) | 37% | 0x25 |
| 228 | 1 | Comp value for case 5 (6 inches) | 38% | 0x26 |
| 229 | 1 | Comp value for case 6 (8 inches) | 40% | 0x28 |
| 230 | 1 | Comp value for case 7 | ... | ... |
| 231 | 1 | Comp value for case 8 | ... | ... |
| 232 | 1 | Comp value for case 9 | ... | ... |
| 233 | 1 | Comp value for case 10 | ... | ... |
| 234 | 1 | Reserved | | |
| 235 | 1 | Reserved | | |
| 236 | 1 | Reserved | | |
| 237 | 1 | Reserved | | |
| 238 | 1 | Reserved | | |
| 239 | 1 | Reserved | | |
| 240 | 1 | Reserved | | |
| 241 | 1 | Reserved | | |
| 242 | 1 | Reserved | | |
| 243 | 1 | Reserved | | |
| 244 | 1 | Reserved | | |
| 245 | 1 | Checksum for fields 224-244 | | |

The "Data address" column gives the memory addresses in memory 48. The "Data size" column gives the data size of each data item in the table. Each entry comprises the compensation value that should be applied by EDC 36 for the given trace length, in both decimal and hexadecimal representation. The decimal value indicates the value of $(V_{PEAK}-V_{TOP})/V_{TOP}$, as defined in FIG. 3 above. The hexadecimal value provides the value that is to be written by processor 40 to EDC 36 in order to achieve this value. The rows of the table are associated with "cases," having respective trace lengths. Typically, a best fit trend line having a certain slope and offset is found for this set of trace lengths, such as using testing and/or simulation. This process is described further below. In some embodiments, different trend lines are computed for different types of traces, stacked connectors, active vs. passive traces, different PCB materials or configurations, etc. In the present example, however, the first six cases correspond to FR4 circuit traces having six different lengths.

Consider, for example, a scenario in which the actual trace length is 3.5 inches. As can be seen in the table, the nearest table entry has a trace length of 4 inches. Processor 40 therefore reads from the table a compensation value of 34%, which corresponds to a trace length of 4 inches.

Processor 40 then corrects the identified nearest table entry to account for the difference between the trace length of the nearest table entry and the actual length of trace 28, at a length correction step 68. In the example above, the difference is 4−3.5=0.5 inches.

In some embodiments, a best fit calculation is performed on the known table entries (i.e., the compensation values and corresponding trace lengths). The best fit calculation provides the marginal contribution of every additional inch of circuit trace to the desired compensation value. In the present example, fitting the six known compensation values to a straight line provides a slope of 0.036. In other words, every additional inch of circuit trace length adds 3.6% to the desired compensation value. Thus, in the present example, the corrected compensation value is 34−(4−3.5)*3.6=32.2%.

In some cases, the dependence of compensation value on trace length may not be linear. Thus, processor 40 may apply the correction of step 68 using other means, such as by applying polynomial fitting to the table entries.

In some embodiments, processor 40 further corrects the desired compensation value in order to remove offsets that are present in the entries of table 52, at an offset removal step 72. These offsets originate, for example, from inaccuracies in the calibration setup in which the table entries are obtained. In these embodiments, processor 40 holds one or more offset correction tables, which contain offset corrections for different compensation values.

In some embodiments, two offset tables are used. One table, denoted "post-emphasis correction offset," holds fixed offsets related to the different ports of the optical equipment in question. The table holds the fixed offsets together with the corresponding trace lengths. A second table, denoted "corrected emphasis" holds the compensation value to be applied after the application of the methods described herein.

Processor 40 looks-up the offset correction table with the compensation value computed at step 68 (32.2% in the present example), and retrieves the appropriate offset correction factor corresponding to this compensation value. In the present example, a compensation value of 32.2% corresponds, after offset correction, to a corrected value of 29.38%.

Having corrected the offset, processor 40 configures EDC 36 to apply the appropriate pre-emphasis compensation value (29.38% in the present example), at a compensation configuration step 76. This compensation value is sometimes referred to as an actual compensation value. From this point, the EDC is configured to apply pre-emphasis that accounts for the specific SFP+ module and the actual length of the circuit trace. As a result, EDC 36 is able to correct the distortion caused by the circuit trace with high accuracy, so as to maintain the desired quality level of the optical signal at the output of SFP+ module 32.

Calibration Setup for Measuring Compensation Values

In some embodiments, the compensation values that are pre-programmed into memory 48 of module 32 are measured using a dedicated calibration setup. The calibration process described below is typically performed on SFP+ modules of different versions (e.g., produced by different vendors).

FIG. 5 is a block diagram that schematically illustrates a setup 80 for calibrating signal compensation values, in accordance with an embodiment of the present invention. Setup 80 comprises a reference line card 84, on which several circuit traces 28 having different lengths are disposed. Each circuit trace is connected to a port into which an SFP+ module 32 can be inserted. The opposite side of each trace is terminated by a test port 86.

In the example of FIG. 5, card 84 comprises two traces 28. In practice, however, the setup may comprise any desired number of circuit traces. For example, the six compensation values in the table addressed in the description of FIG. 3 above may be measured using a reference line card having six traces of different lengths.

In order to measure the compensation value for a given trace on card 84, a SFP+ module is inserted into the port in question. The respective test port 86 is connected to a test board 88, which comprises an EDC.

The calibration setup further comprises a signal source 92, in the present example a laser that is modulated by a Programmable Pulse Generator (PPG). Signal source 92 generates an optical signal that emulates the rate and waveform of the optical signals produced by line card 20. The optical signal is input to the SFP+ module, which converts the optical signal to an electrical signal. The electrical signal traverses trace 28, exits card 84 at test port 86 and enters EDC 36 on test board 88.

The EDC pre-emphasizes the electrical signal in accordance with the compensation value it is configured to apply, and outputs the signal back to test port 86. The pre-emphasized signal traverses trace 28 again, and is converted to an optical signal by SFP+ module 32. The output optical signal is monitored by a digital oscilloscope 96. The oscilloscope displays the signal, and sometimes measures one or more figures-of-merit that are indicative of the optical signal quality. For example, the oscilloscope may display an eye mask of the optical signal, and may measure the signal TWDP, jitter, Data-Dependent Jitter (DDJ), Optical Modulation Amplitude (OMA), Data Dependent Pulse Width Shrinkage (DDPWS), Voltage Modulation Amplitude (VMA), or any other suitable figure-of-merit that is suitable for evaluating the quality of optical signals. Additionally or alternatively, the quality of the optical signal can be measured or evaluated manually by a user using the oscilloscope display.

For example, the compensation value can be optimized for IEEE TP2 compliance, for maximizing the eye mask margin (e.g., in SR and LR links), for joint eye mask maximization and TWDP minimization (e.g., in LRM links), or to meet any other quality-related criterion.

The optimal compensation value of EDC 36 for the given trace length is found by configuring the EDC with different compensation values. When the EDC comprises a configurable-gain amplifier as well as a configurable filter, setting the given compensation values may comprise configuring both the amplifier and the filter, so as to achieve higher granularity.

The optical signal quality is monitored by the oscilloscope and/or by the user for each compensation value. The compensation value, which causes the optical signal monitored by oscilloscope 96 to have the best quality, is output as the value to be stored in memory 48 of SFP+ module 32. (Reference line card 84 and the circuit traces disposed thereon are assumed to be of the same type, materials and technology as those of line card 20, in which the calibration results are to be used. Typically, the process is repeated for each type of EDC.)

In some embodiments, calibration measurements are carried out at several input impedances to card 84 (e.g., impedances between 90 and 110 Ohm). The measurements at the different impedances can be averaged. Alternatively, the set of measurements acquired at impedance that is closest to the actual impedance of line card 20 can be selected.

In some cases, the compensation values measured using calibration setup 80 contain offsets that are caused, for example, by differences between the calibration setup and the line card in which the SFP+ modules and EDCs will be deployed. Such offsets can be estimated by and stored in an offset table in processor 40, as explained above.

For example, offsets that are caused by test board 88 (e.g., by the circuit traces or connectors of the test board) can be measured by (1) connecting the test board output directly to oscilloscope 96 and (2) finding the optimum compensation values of the EDC with card 84 bypassed. As another example, the offset caused by the external test board and the cables and connectors that connect this board to card 84 can be measured by (1) performing a similar calibration measurement on an active circuit trace of an actual line card 20 having the same length as one of the traces of card 84, and (2) comparing the optimum compensation values obtained on the calibration setup and on the actual line card.

Although the embodiments described herein mainly address electrical signal pre-emphasis in optical transmission equipment in order to compensate for distortion caused by circuit traces, the principles of the present invention can also be used for other applications, such as for transmission over direct attach copper cable links. Example links are defined in the SFF-8431 standard, cited above. Compensation for circuit trace distortion in these applications can increase the achievable copper cable length.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   delivering an electrical signal over an electrical conductor to a transmitter module, which includes a memory holding a plurality of compensation values each corresponding to a different conductor length, wherein the compensation values each include a portion to compensate for a distortion of the electrical signal caused by the transmitter module;
   retrieving one or more of the compensation values from the memory of the transmitter module;
   modifying a waveform of the electrical signal responsively to the retrieved compensation values; and
   transmitting the electrical signal having the modified waveform using the transmitter module over a communication link.

2. The method according to claim 1, wherein the transmitter module comprises an optical transmitter module, and wherein transmitting the electrical signal comprises converting the electrical signal having the modified waveform into an optical signal.

3. The method according to claim 2, wherein the optical transmitter module conforms to a Small Form-factor Pluggable Plus (SFP+) form factor.

4. The method according to claim 2, and comprising pre-calculating the compensation values held in the memory by monitoring a quality level of the optical signal and storing in the memory the compensation values that optimize the quality level at the respective, different conductor lengths.

5. The method according to claim 2, wherein modifying the waveform comprises determining an actual compensation value to be applied to the waveform, and configuring an Electrical Dispersion Compensation (EDC) device to apply the actual compensation value.

6. The method according to claim 5, wherein configuring the EDC device comprises jointly setting a filter tap and an amplifier gain of the EDC device.

7. The method according to claim 1, wherein the electrical conductor comprises a circuit trace disposed on a Printed Circuit Board (PCB).

8. The method according to claim 1, wherein the electrical conductor has a given length, and wherein modifying the waveform comprises computing an actual compensation value, to be applied to the waveform, responsively to the retrieved compensation values and to the given length of the electrical conductor.

9. The method according to claim 8, wherein computing the actual compensation value comprises selecting one of the retrieved compensation values, which corresponds to a conductor length that is nearest to the given length, and correcting the selected compensation value responsively to a difference between the conductor length of the selected compensation value and the given length of the electrical conductor.

10. The method according to claim 1, and comprising pre-calculating the compensation values held in the memory using a calibration setup, wherein modifying the waveform comprises correcting an offset in the retrieved compensation values, which is caused by the calibration setup.

11. The method according to claim 1, wherein the electrical signal comprises a sequence of electrical pulses having respective rising edges and trailing edges, and wherein modifying the waveform comprises emphasizing at least one edge type of the pulses selected from a group of types consisting of the rising edges and the falling edges.

12. The method according to claim 1, wherein transmitting the electrical signal comprises sending the electrical signal having the modified waveform over a direct attached copper link.

13. The method of claim 1, wherein the electrical conductor has an effective length that is increased by internal wiring and/or connectors in the transmitter module, wherein the portion of the compensation value to compensate for the distortion of the electrical signal caused by the transmitter module is configured to compensate for an effective length increase caused by the internal wiring and/or connectors, and wherein retrieving the one or more of the compensation values comprises:

retrieving a compensation value that corresponds to the effective length of the electrical conductor that includes the internal wiring and/or connectors in the transmitter module.

14. An apparatus, comprising:
an optical transmitter module, comprising:
an optical transducer operative to convert an electrical signal, which is delivered thereto over an electrical conductor, into an optical signal, and
a memory, which is configured to hold a plurality of compensation values each corresponding to a different conductor length and wherein the compensation values each include a portion to compensate for a distortion of the electrical signal caused by the optical transmitter module;
a compensation unit, which is coupled to modify a waveform of the electrical signal provided to the optical transmitter module responsively to one or more externally-configurable parameters; and
a processor, which is coupled to retrieve one or more of the compensation values from the memory of the optical transmitter, to calculate the parameters responsively to the retrieved compensation values, and to configure the compensation unit with the calculated parameters.

15. The apparatus according to claim 14, wherein the optical transmitter module conforms to a Small Form-factor Pluggable Plus (SFP+) form factor.

16. The apparatus according to claim 14, wherein the electrical conductor comprises a circuit trace disposed on a Printed Circuit Board (PCB).

17. The apparatus according to claim 14, wherein the electrical conductor has a given length, and wherein the processor is coupled to compute an actual compensation value, to be applied to the waveform, responsively to the retrieved compensation values and to the given length of the electrical conductor, and to configure the compensation unit to apply the actual compensation value.

18. The apparatus according to claim 17, wherein the processor is coupled to select one of the retrieved compensation values, which corresponds to a conductor length that is nearest to the given length, and to correct the selected compensation value responsively to a difference between the conductor length of the selected compensation value and the given length of the electrical conductor.

19. The apparatus according to claim 14, wherein the compensation values held in the memory are pre-calculated using a calibration setup, and wherein the processor is coupled to correct an offset in the retrieved compensation values, which is caused by the calibration setup.

20. The apparatus according to claim 14, wherein the compensation values held in the memory optimize a quality level of the optical signal at the respective, different conductor lengths.

21. The apparatus according to claim 14, wherein the compensation unit comprises a filter having at least one configurable tap and an amplifier having an adjustable gain, and wherein the processor is coupled to configure the compensation unit with the calculated parameters by jointly setting the configurable tap and the adjustable gain.

22. The apparatus according to claim 14, wherein the electrical signal comprises a sequence of electrical pulses having respective rising edges and trailing edges, and wherein the compensation unit is coupled to modify the waveform by emphasizing at least one edge type of the pulses selected from a group of types consisting of the rising edges and the falling edges.

23. The apparatus of claim 14, wherein the optical transmitter module comprises internal wiring and/or connectors that increase an effective length of the electrical conductor, and wherein the portion of the compensation value to compensate for the distortion of the electrical signal caused by the transmitter module is configured to compensate for the effective length increase caused by the internal wiring and/or connectors in the transmitter module.

24. An apparatus, comprising:
a package which substantially conforms to a form factor specified by an optical transceiver standard;
an optical transducer disposed in the package configured to receive an electrical signal via an electrical conductor and to convert the electrical signal into an optical signal; and
a memory disposed in the package and configured to hold compensation values for modifying a waveform of the electrical signal responsively to a length of the electrical conductor and wherein the compensation values each include a portion to compensate for a distortion of the electrical signal caused by internal wiring and/or connectors in the package.

25. The apparatus according to claim 24, wherein the package conforms to a Small Form-factor Pluggable Plus (SFP+) form factor.

\* \* \* \* \*